No. 842,785. PATENTED JAN. 29, 1907.
O. E. HINTZ.
MECHANICAL MOVEMENT.
APPLICATION FILED MAR. 26, 1906.
2 SHEETS—SHEET 1.
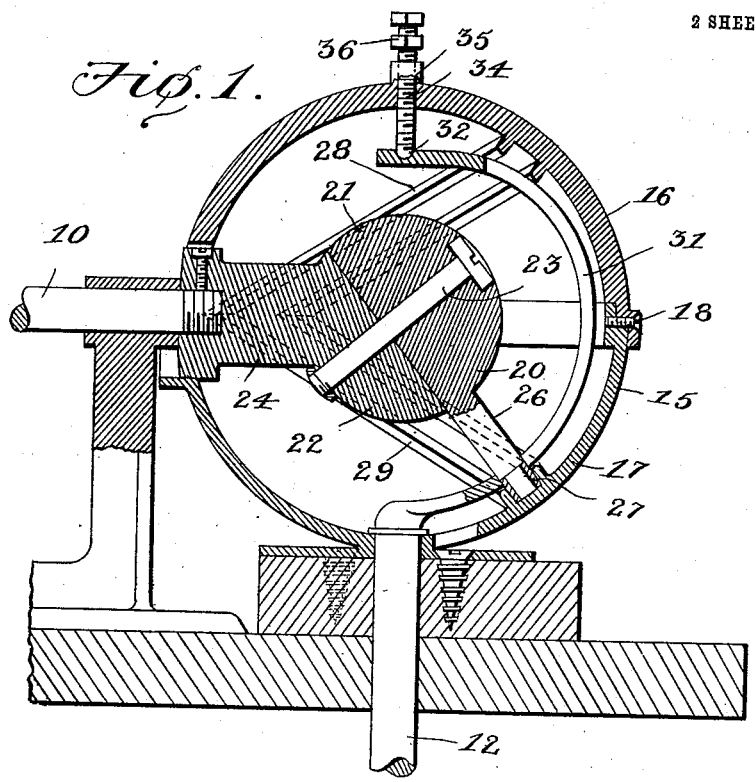
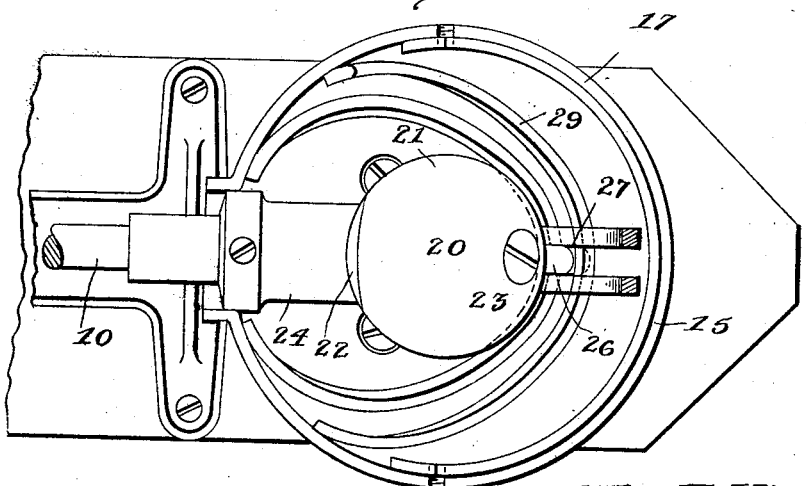
WITNESSES:
Otto E. Hintz,
INVENTOR
By
ATTORNEYS No. 842,785. PATENTED JAN. 29, 1907.
O. E. HINTZ.
MECHANICAL MOVEMENT.
APPLICATION FILED MAR. 26, 1906.

2 SHEETS—SHEET 2.

WITNESSES:

Otto E. Hintz,
INVENTOR

By
ATTORNEYS

THE NORRIS PETERS CO., WASHINGTON, D. C.

UNITED STATES PATENT OFFICE.

OTTO EDWARD HINTZ, OF BELLEVUE, IOWA.

MECHANICAL MOVEMENT.

No. 842,785.    Specification of Letters Patent.    Patented Jan. 29, 1907.

Application filed March 26, 1906. Serial No. 308,178.

*To all whom it may concern:*

Be it known that I, OTTO EDWARD HINTZ, a citizen of the United States, residing at Bellevue, in the county of Jackson and State of Iowa, have invented a new and useful Mechanical Movement, of which the following is a specification.

This invention relates to mechanism for transforming continuous rotary motion in one direction into oscillatory motion, and has for its principal object to provide means for connecting a pair of shafts or similar members, one of which is arranged to revolve in one direction and to transmit to the second shaft a simple oscillatory movement to an extent nearly equal to a complete rotation.

With this and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 3:
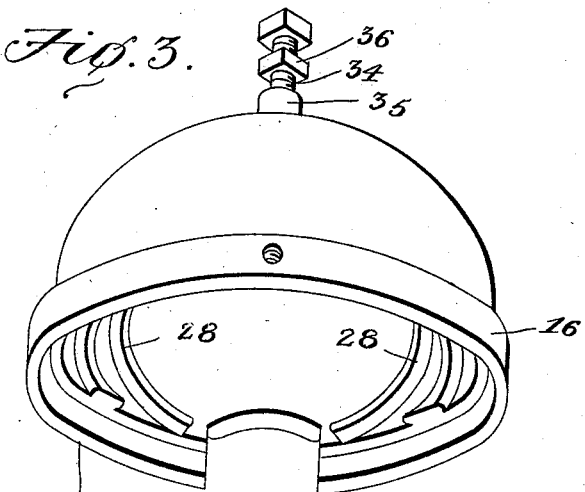
Figure 4:
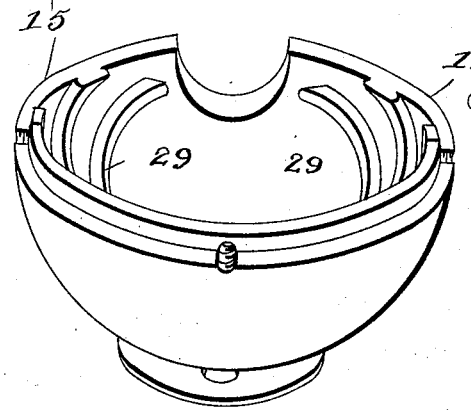
Figure 5:
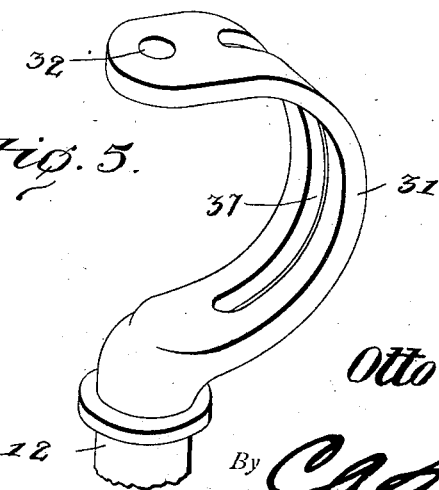

In the accompanying drawings, Figure 1 is a sectional elevation of a mechanical movement constructed in accordance with the invention. Fig. 2 is a plan view of the same with the upper half of the casing removed, the oscillatory bar being shown in section. Fig. 3 is a detail perspective view of the upper section of the casing. Fig. 4 is a similar view of the lower section of the casing. Fig. 5 is a detail perspective view of the oscillatory member.

Similar numerals of reference are employed to indicate corresponding parts throughout the several figures of the drawings.

The revoluble or power-transmitting shaft 10 is mounted in suitable bearings and is connected to or provided with means by which continuous rotary movement in one direction may be imparted thereto. The driven shaft 12 is shown in the present instance as arranged with its axis at a right angle to the axis of the shaft 10, and the ends of both shafts extend within a hollow spherical casing 15, which incloses the mechanism by which movement is transmitted from one shaft to the other, and this casing is divided into an upper section 16 and a lower section 17, said sections being divided approximately in the horizontal plane of the axis of shaft 10 and having suitable overlapping flanges through which securing screws or bolts 18 may pass.

At the center of the casing 15 is arranged a sphere 20, that is divided into two sections 21 and 22, the section 21 being larger than the section 22 and the two sections being connected together by a bolt 23, the axis of which crosses the plane of the axis of shaft 10 at an angle of about forty-five degrees. The section 22 of the sphere is provided with a neck or shank 24, that is secured to the inner end of the shaft 10 and constantly rotates therewith, carrying with it the approximately hemispherical block 21, which, in addition to its rotative movement around the axis of the shaft 10, is also arranged to rotate with the bolt 23 as an axis.

Projecting radially from the center of the sphere 20 and supported by the member 21 is a stud 26, which is provided at its outer end with an antifriction-roller 27, that is adapted to travel in a double helical track 28 29, this track being formed by a pair of spaced parallel ribs. The upper track or guideway 28 is carried by the section 16 of the casing, and the lower track or guideway 29 is carried by the lower section of the casing, these two trackways joining at the juncture of the sections of the casing and at points on opposite sides of the neck or shank 24 of the spherical member 22.

When the shaft 10 is turned and the roller 27 is within the tracks or guideways, it will cause the section 21 of the spherical block 20 to rotate with the bolt 23 as an axis, the roller 27 traveling continuously in the track or guideway and passing from one section to the other as the shaft 10 continues to revolve. When the roller moves from one section of the track to the other at the juncture of the two sections of the casing, it will travel in the opposite direction, while the member 21 of the spherical block will be rotated with the bolt 23 as an axis.

To the upper end of the shaft 12 is secured a preferably flat semicircular bar 31, the upper end of which extends across the vertical plane of the shaft 12 and is provided with a recess 32, that is in alinement with the axis of said shaft. The upper section 16 of the spherical casing carries an adjustable pin or screw 34, the lower rounded end of which enters the recess 32 and assists in maintaining the bar 31 in proper position—that is to say, so that the curved line on which the bar is struck will have its center coincident with the center of the sphere 20 and in the line of intersection of the planes of the shafts 10 and 12. This pin or screw is arranged in a threaded opening formed in a boss 35 in the upper portion of the casing and when once adjusted may be locked in place by a suitable nut 36.

The bar 31 is provided with an arcuate slot 37, and through this slot extends the stud 26, so that as the stud is compelled to move in the helical trackway it will transmit oscillatory movement to said bar 31.

As the block 22 is rotated by the shaft 10, the block 21 is prevented from rotating with it by the stud 26 being engaged in the trackway 28 29, and instead of rotating with the block 22 the block 21 will slide on the face thereof and move the stud 26 along in the trackway, carrying with it the slotted bar 31 and imparting movement to the shaft 12. Three complete rotations of the shaft 10 results in one complete cycle of movement of the stud 26 in the trackway, and one complete cycle of movement of the stud results in two complete oscillatory movements of the vertical shaft 12, the bar 31 being carried from one side of the neck 24 to the opposite side thereof while the stud is traveling in the upper half of the trackway and then back again to its original position as the stud is traveling in the lower half of the trackway.

I claim—

1. In mechanism for transforming rotary motion into oscillatory motion, a revoluble shaft, an oscillatory member, a block supported by the shaft and free for rotative movement in a plane at an angle to the axis of the shaft, a stud projecting from said block, a cam-track in which said stud engages, and a slotted bar carried by the oscillatory member and receiving motion from said stud.

2. In mechanism for transforming rotary movement into oscillatory movement, a revoluble shaft, a block supported by and rotated with the shaft, said block being mounted for rotative movement around an axis disposed at an angle to the plane of the shaft-axis, a stud carried by said block, a stationary cam-track for directing the movement of the stud, and a curved bar carried by the oscillatory member and having a slot through which said stud extends.

3. In mechanism for transforming rotary motion into oscillatory motion, a revoluble member, a divided sphere arranged at one end of said revoluble member, one portion of the sphere being rigidly secured to said member, a pivot-bolt disposed obliquely to the axis of movement of said member, and connecting the two sections of the sphere, a stud carried by the second section of the sphere and extending radially from the center of said sphere, an antifriction-roller carried by the stud, a spherical casing formed in sections, a double track or guideway carried by the sections of the casing and receiving the antifriction-roller, an approximately semicircular bar carried by the oscillatory member and extending partly around said sphere, a bearing member for the free end of the bar, said bar having an elongated slot through which the stud extends, whereby movement is imparted from the stud to said bar.

4. In mechanism for transforming rotary movement into oscillatory motion, a continuously-revoluble member, a block pivotally connected thereto and arranged to rotate thereon around an axis that is oblique to the axis of rotation of said revoluble member, an arm carried by said block, a cam-track in which said arm is guided, and an oscillatory member including a slotted bar through which said arm extends.

In testimony that I claim the foregoing as my own I have hereto affixed my signature in the presence of two witnesses.

OTTO EDWARD HINTZ.

Witnesses:
PHIL J. WEBER,
AYLMER COLE.